(12) United States Patent
Dinu et al.

(10) Patent No.: US 7,460,785 B2
(45) Date of Patent: Dec. 2, 2008

(54) PERFORMANCE MONITORING IN AN OPTICAL COMMUNICATION SYSTEM

(75) Inventors: Mihaela Dinu, Eatontown, NJ (US);
Hernando Garcia, Freehold, NJ (US);
Daniel Kilper, Fair Haven, NJ (US);
Wayne H. Knox, Pittsford, NJ (US);
Howard R. Stuart, Red Bank, NJ (US);
Chunhui Xu, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1345 days.

(21) Appl. No.: 10/109,623

(22) Filed: Mar. 28, 2002

(65) Prior Publication Data

US 2002/0176129 A1    Nov. 28, 2002

Related U.S. Application Data

(60) Provisional application No. 60/293,047, filed on May 23, 2001.

(51) Int. Cl.
*H04B 17/00* (2006.01)
(52) U.S. Cl. ........................................................ 398/33
(58) Field of Classification Search ............... 398/9–14, 398/17, 19, 29, 33, 25
See application file for complete search history.

(56) References Cited

U.S. PATENT DOCUMENTS

| | | | |
|---|---|---|---|
| 4,198,634 A | 4/1980 | Jernigan et al. | 343/100 |
| 5,513,029 A | 4/1996 | Roberts | |
| 5,651,030 A * | 7/1997 | Wong et al. | 375/316 |
| 5,760,732 A * | 6/1998 | Marmarelis et al. | 342/145 |
| 5,828,679 A * | 10/1998 | Fisher | 372/6 |
| 6,178,025 B1 * | 1/2001 | Hardcastle et al. | 398/17 |
| 6,204,926 B1 * | 3/2001 | Maznev et al. | 356/521 |
| 6,310,703 B1 | 10/2001 | Alavie et al. | 359/110 |
| 6,344,910 B1 | 2/2002 | Cao | 359/110 |
| 6,952,306 B1 * | 10/2005 | Anderson | 359/298 |
| 7,024,111 B2 | 4/2006 | Knox et al. | |
| 7,283,744 B2 * | 10/2007 | Dinu et al. | 398/33 |
| 2004/0213338 A1 | 10/2004 | Strawczynski et al. | |
| 2005/0135529 A1 | 6/2005 | Upton et al. | |

* cited by examiner

*Primary Examiner*—Dzung D Tran (57) ABSTRACT

An optical performance monitor (OPM), e.g., for use in an optical network. The OPM may be configured to characterize one or more impairments in an optical signal modulated with data. The OPM has an optical autocorrelator configured to sample the autocorrelation function of the optical signal, e.g., using two-photon absorption. Autocorrelation points at various bit delays independently or in combination with average optical power may be used to detect and/or quantify one or more of the following: loss of data modulation, signal contrast, pulse broadening, peak power fluctuations, timing jitter, and deviations from the pseudo-random character of data. In addition, the OPM may be configured to perform Fourier transformation based on the autocorrelation points to obtain corresponding spectral components. The spectral components may be used to detect and/or quantify one or more of chromatic dispersion, polarization mode dispersion, and misalignment of a pulse carver and data modulator. The OPM may be further configured to generate feedback, e.g., to network operators to improve network performance.

52 Claims, 7 Drawing Sheets

PERFORMANCE MONITORING IN AN OPTICAL COMMUNICATION SYSTEM

CROSS-REFERENCE TO RELATED APPLICATIONS

This application claims priority from U.S. Provisional Patent Application No. 60/293,047 filed May 23, 2001, and entitled "Optical Performance Monitoring Using Optical Autocorrelations."

BACKGROUND OF THE INVENTION

1. Field of the Invention

The present invention relates to optical communication systems and, more specifically, to monitoring the performance of such systems.

2. Description of the Related Art

Fiber optic networks are widely used for data transmission in modem communication systems. Due to increasing data traffic volumes, monitoring and management of networks become increasingly important. For example, such monitoring may include a measurement at a particular point in the network of the quality of an optical signal corresponding to one or more optical communication channels. The optical signal may be analyzed for various impairments, e.g., timing jitter, chromatic dispersion, and the like. Obtained information may then be used to improve the performance of the network, for example, if certain impairments exceed a tolerable level.

One known method of analyzing an optical signal is to tap that signal, convert it into an electrical signal using an optical-to-electrical (O/E) converter, and then analyze the electrical signal for impairments using electrical signal processing methods. However, one disadvantage of this method is that it typically requires high-speed electronics. Furthermore, at relatively high bit rates, either the sensitivity or bandwidth of the available electronics may be insufficient to accurately and/or cost-effectively measure impairments in the optical signal. Consequently, certain impairments might be missed or certain optical signals may be impractical to monitor by such means. Even when the monitoring electronics has the appropriate bandwidth, monitoring impairments that manifest themselves at amplitudes below the sensitivity of the receiver may be advantageous, for example, (1) in preemptive monitoring, i.e., identifying a problem before it impacts performance, or (2) for monitoring the signal at the transmitter, i.e., under the conditions of relatively high fidelity compared to the signal at the receiver. In optical networks with large regions of transparency, i.e., large distances between O/E conversion points, monitoring becomes particularly important for identifying the location of a faulty component and/or diagnosing the cause of an impairment.

Optical methods applied to monitoring optical signals have certain advantages over electrical methods because at least part of the signal processing is accomplished in the optical domain. This may reduce bandwidth requirements to the monitoring electronics. For example, pulse duration and pulse shape measurements, e.g., to determine optical pulse distortions, may be implemented for short optical pulses using nonlinear optical techniques, such as second harmonic generation (SHG) coupled with relatively slow photodetectors and their corresponding electronics. However, a different nonlinear optical method may need to be applied to measure a different parameter of that optical signal.

Although used in laboratory practice to measure some parameters of optical signals (e.g., nonlinear pulse distortions), nonlinear optical methods are not applied to optical performance monitoring in fiber optic networks. This is largely due to a relatively high cost of nonlinear optical components, performance constraints, and/or system complexity.

SUMMARY OF THE INVENTION

According to certain embodiments, the present invention is an optical performance monitor (OPM), e.g., for use in an optical network. The OPM may be configured to characterize one or more impairments in an optical signal modulated with data. The OPM has an optical autocorrelator configured to sample the autocorrelation function of the optical signal using two-photon absorption. Autocorrelation points at various bit delays, independently or in combination with average optical power, may be used to detect and/or quantify one or more of the following: loss of data modulation, signal contrast, pulse broadening, peak power fluctuations, timing jitter, and deviations from the pseudo-random character of data. In addition, the OPM may be configured to perform Fourier transformation based on the autocorrelation points to obtain corresponding spectral components. The spectral components may be used to detect and/or quantify one or more of chromatic dispersion, polarization mode dispersion, and misalignment of a pulse carver and data modulator. The OPM may be further configured to generate feedback, e.g., to network operators to improve network performance.

According to one embodiment, the present invention is an apparatus for performance monitoring in a communication system, the apparatus comprising: (a) an optical autocorrelator (OAC) configured to receive an optical signal from the communication system and to generate one or more samples of an autocorrelation function corresponding to the optical signal; and (b) a signal processing module (SPM) configured to characterize an impairment in the optical signal based on the one or more samples.

According to another embodiment, the present invention is a method for monitoring performance in a communication system, the method comprising the steps of: (A) generating one or more samples of an optical autocorrelation function corresponding to an optical signal of the communication system; and (B) characterizing an impairment in the optical signal based on the one or more samples.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Optical Performance Monitor

Figure 1:
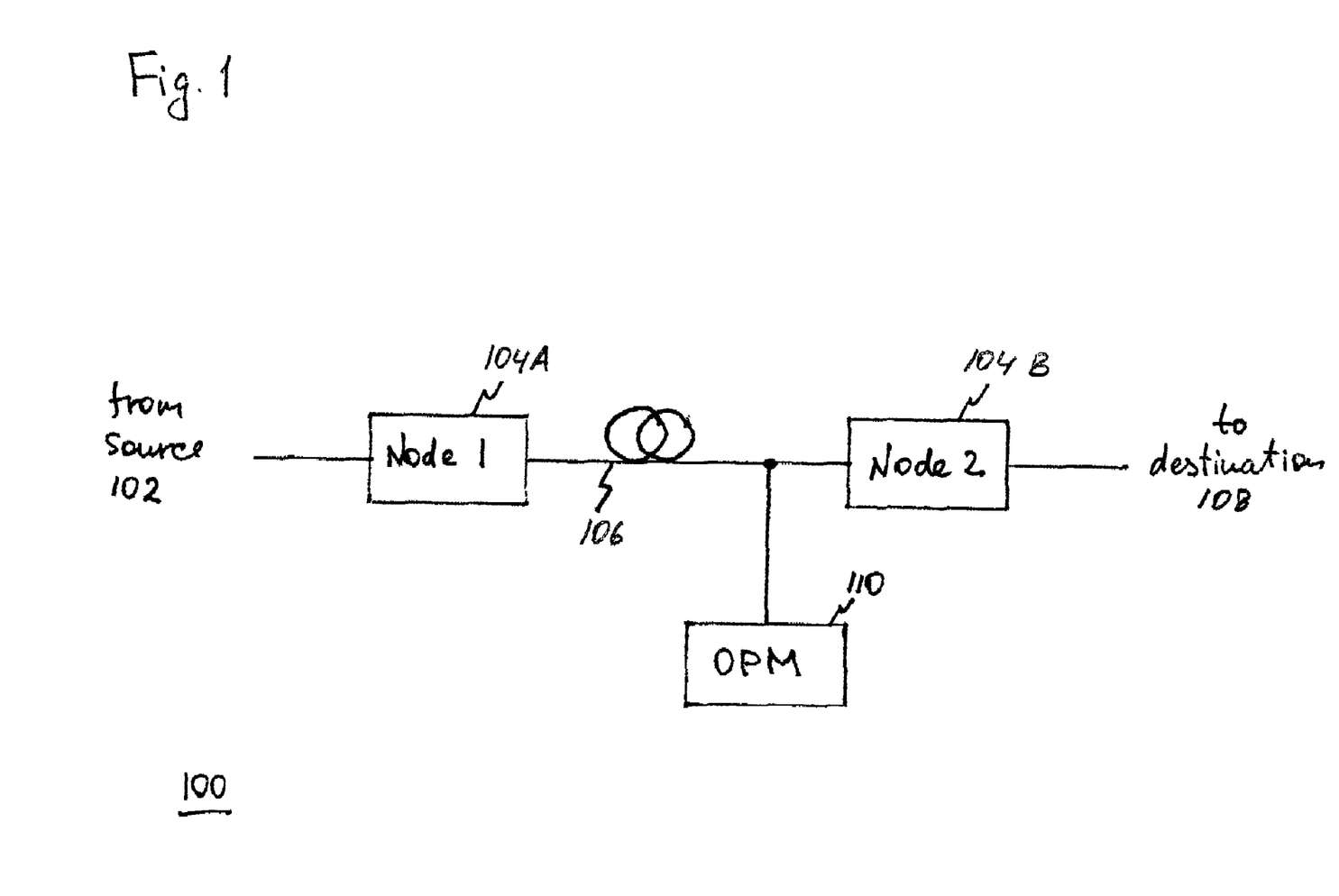
FIG. 1 illustrates a fiber optic network utilizing an optical performance monitor according to one embodiment of the present invention.

FIG. 1 illustrates a fiber optic network 100, which utilizes an optical performance monitor (OPM) 110 according to one embodiment of the present invention. Network 100 is configured to carry optical signals modulated with data from a source node 102 to a destination node 108 via a plurality of intermediate nodes 104. A long-haul, metro, or access optical transmission link, such as link 106, may connect a pair of nodes, such as intermediate nodes 104A and 104B shown in FIG. 1. Link 106 may include optical amplifiers (not shown) configured to boost the optical signals, e.g., attenuated by light absorption in the optical fiber. One or more optical performance monitors, such as OPM 110, may be located at one or more different points along network 100 to monitor the quality of optical signals at those points. In FIG. 1, OPM 110 is illustrated as being connected to link 106 between nodes 104A and 104B.

Figure 2:
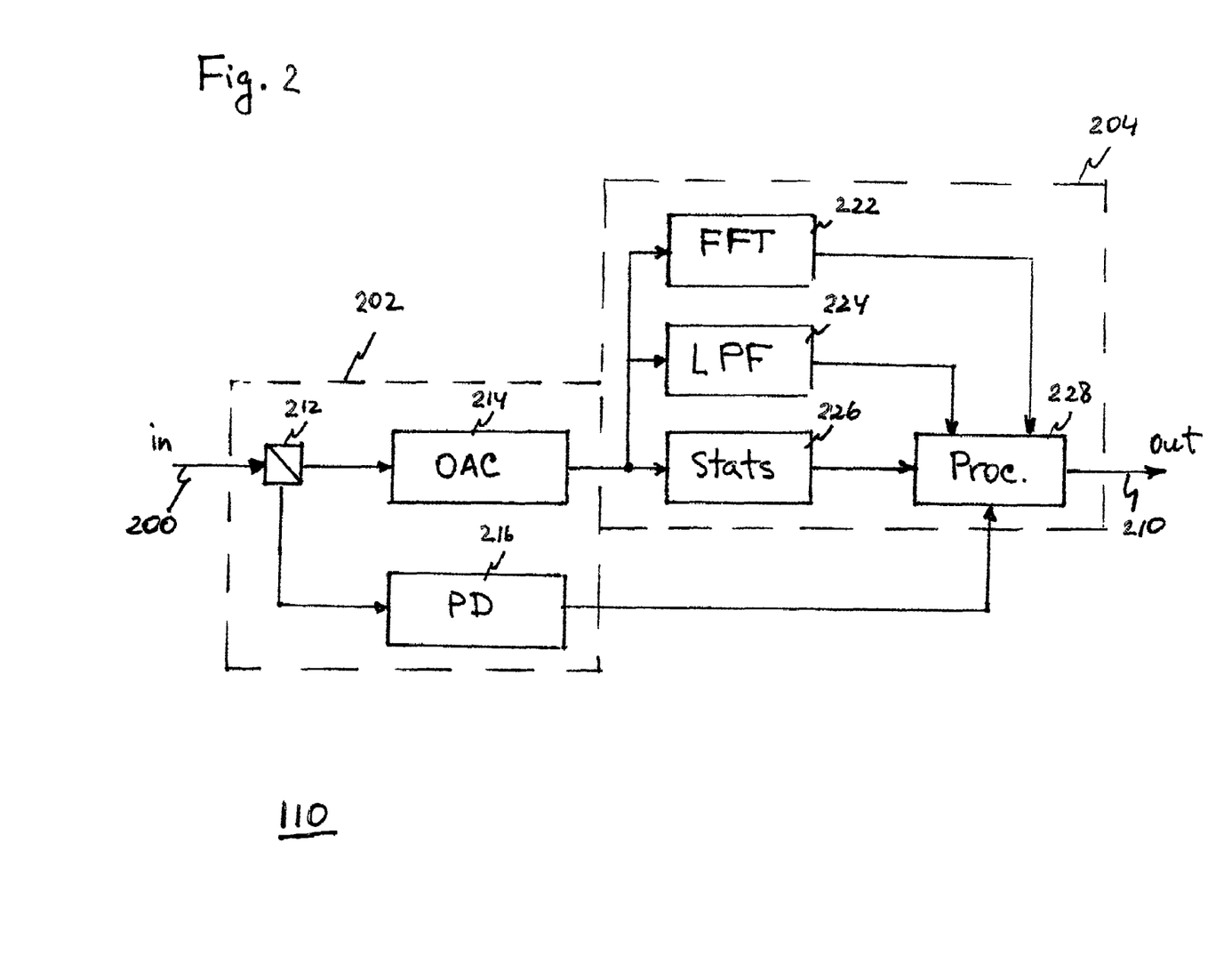
FIG. 2 shows an optical performance monitor that may be used in the fiber optic network of FIG. 1 according to one embodiment of the present invention.

FIG. 2 shows OPM 110 according to one embodiment of the present invention. In this embodiment, OPM 110 comprises an opto-electronic module (OEM) 202 and a signal-processing module (SPM) 204. OEM 202 is configured to (i) receive an optical input signal 200, e.g., from link 106 using an optical tap; (ii) optically process that signal; and (iii) generate one or more electrical outputs corresponding to signal 200 for further processing in SPM 204. SPM 204 is configured to process the one or more electrical outputs of OEM 202 to detect one or more impairments in signal 200. SPM 204 may be further configured to generate an output signal 210 that may be used, e.g., to adjust the performance of link 106.

In one embodiment, OEM 202 comprises a splitter 212, an optical autocorrelator (OAC) 214, and a power detector (PD) 216. Splitter 212 splits signal 200 into two optical signals applied to OAC 214 and PD 216, respectively. In a preferred implementation, the most of signal 200 (e.g., 99%) is directed to OAC 214 while only a small fraction (e.g., 1%) is directed to PD 216. In one embodiment, PD 216 may be a relatively slow photodetector configured to generate an electrical signal proportional to the average optical power of signal 200. That electrical signal is output from OEM 202 to SPM 204.

OAC 214 is configured to measure an optical autocorrelation function of signal 200. In general, an autocorrelation function, A(t), of a time-dependent function, S(τ), may be expressed by Equation (1), as follows:

$$A(t) = S(\tau)S(t+\tau) \quad (1)$$

A(t) is obtained by multiplying S(τ) by its copy delayed by a time interval (t, delay period). A(t) may be sampled using a set of delay periods. Depending on the application, different selected numbers of samples may be used to represent A(t). In one embodiment, OAC 214 is configured to sample the autocorrelation function of signal 200 in N points, where N≧1. OAC 214 is further configured to output an electrical signal corresponding to the N sampled points to SPM 204 for further processing. Further description of various embodiments of OAC 214 is given below in the context of FIGS. 3 and 4.

Referring again to FIG. 2, in one embodiment, SPM 204 comprises a fast Fourier transform (FFT) element 222, a low pass filter (LPF) element 224, and a statistical element 226, all connected to a processor 228. Processor 228 is configured to process the signals generated by elements 224-226 and PD 216 to identify certain impairments in signal 200. Processor 228 may be further configured to generate signal 210 to provide feedback to network operators, e.g., for taking corrective actions to improve network performance. In one embodiment, processor 228 may be implemented as a look-up table. In other embodiments, different implementations of processor 228 may also be used. In addition, processor 218 may be part of a different device connected to OPM 110.

FFT element 222 is configured to generate a Fourier transform based on the N autocorrelation points sampled by OAC 214. In one embodiment, FFT element 222 may also be configured to zero-fill the N sampled points prior to generating the Fourier transform. LPF element 224 is configured to measure average amplitudes of one or more selected points within the N sampled autocorrelation points, e.g., using low pass filtering. Statistical element 226 is configured to measure amplitude changes corresponding to one or more selected points within the N sampled autocorrelation points (which selection may be the same as or different from that measured by LPF element 224). In one embodiment, LPF element 224 and statistical element 226 may be further configured to measure relative average amplitudes and relative amplitudes of their respectively selected points.

In one embodiment of the present invention, OAC 214 may be a commercially available autocorrelator, e.g., model PulseCheck-150, available from INRAD, Inc., of Northvale, N.J. Using such an autocorrelator, an autocorrelation function is sampled by mechanically scanning one leg of an interferometer and then combining the optical signal from that leg with a signal from another leg in a nonlinear optical medium. Although such technique may be adequate for certain applications, it has certain drawbacks. For example, one drawback of mechanical scanning is that it is slow compared to monitoring speeds required in modern networks. In addition, motors used in mechanical scanning may require periodic maintenance and/or replacement.

Figure 3:
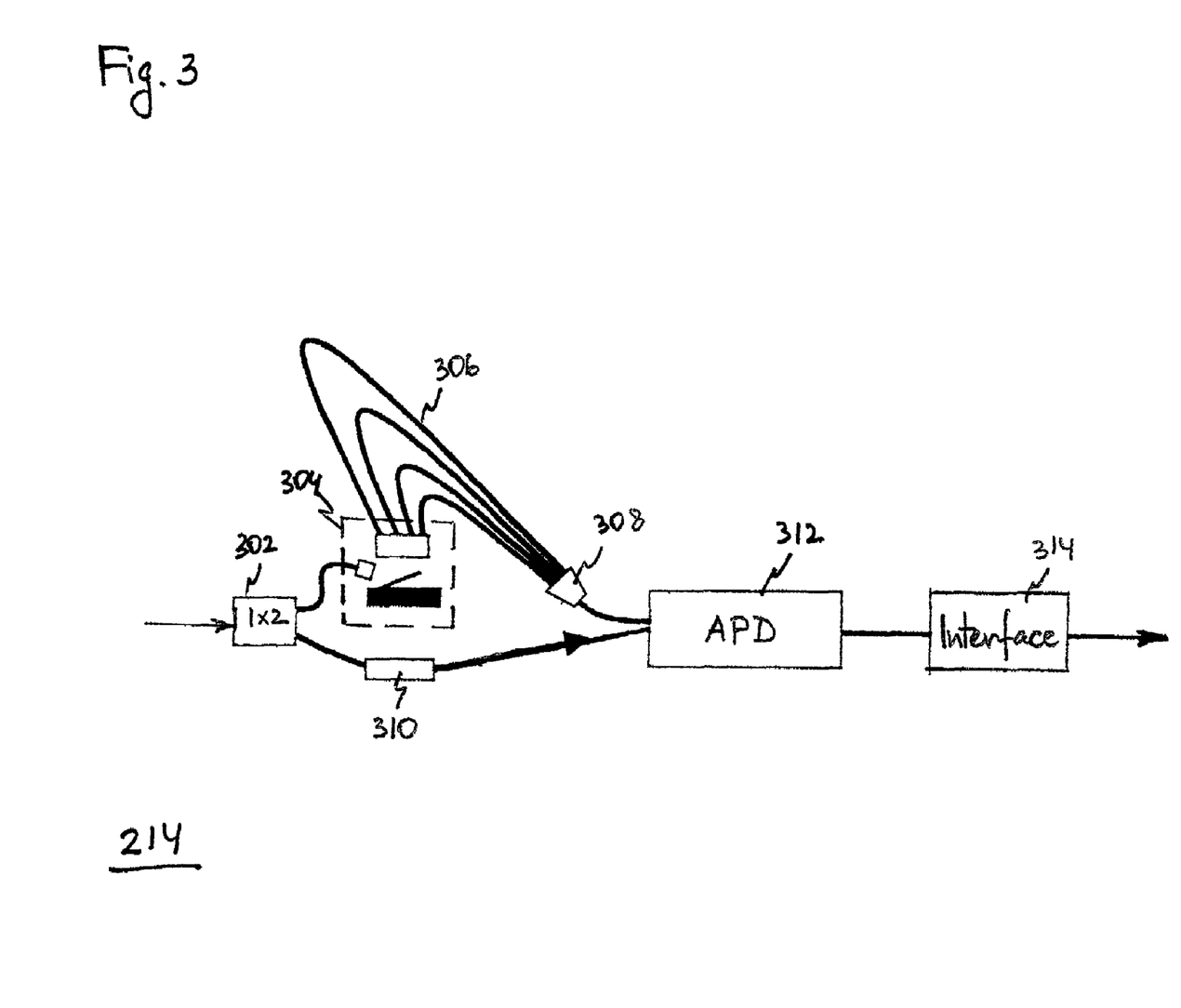
FIG. 3 shows an optical autocorrelator that may be used in the optical performance monitor of FIG. 2 according to one embodiment of the present invention.

FIG. 3 shows an alternative implementation of OAC 214, in which the scanning speed is significantly increased compared to commercially available autocorrelators. OAC 214 of FIG. 3 comprises a 1×2 splitter 302, a MEMS (microelectromechanical system) switch 304, N fixed fiber delay legs 306, an N×1 coupler 308, an optional adjustable delay 310, an avalanche photodiode (APD) 312, and an output interface 314. OAC 214 is configured to operate as follows. An optical signal applied to OAC 214 is split into two copies using splitter 302. The two copies are sent through two different optical paths, respectively: a first signal copy through a first optical path, comprising switch 304, delay legs 306, and coupler 308, and a second signal copy through a second optical path, comprising optional delay 310.

In the first optical path, a MEMS mirror in switch 304 may be stepped through positions corresponding to different delay legs 306 to send the first signal copy through a particular leg and into coupler 308. The first signal copy is then processed in APD 312 with the second signal copy from the second optical path to generate a particular sample of the autocorrelation function. In one embodiment, APD 312 is configured to detect optical signals through two-photon absorption. As such, it generates an electrical signal corresponding to a product of the two signals. That electrical signal is then output from OAC 214 using interface 314. After the MEMS mirror is stepped through N positions corresponding to the N different delay legs 306, N samples of the autocorrelation function will have been generated.

In one embodiment, delay legs 306 may include a wide range of fixed delays to allow monitoring of optical signals having different bit rates. For example, delay legs 306 may include five individual delay legs corresponding to 10-Gb/s and 40-Gb/s signals, as follows: (1) 0 ps; (2) 12.5 ps (i.e., ½ bit for 40 Gb/s); (3) 25 ps (i.e., 1 bit for 40 Gb/s); (4) 50 ps (i.e., ½ bit for 10 Gb/s); and (5) 100 ps (i.e., 1 bit for 10 Gb/s). Different delays may be implemented with the same set of delay legs 306 by using adjustable delay 310.

In the above-described embodiments of OAC 214, N samples of the autocorrelation function are obtained in a serial fashion, such that a different sample point may correspond to a different data set in the optical signal. Such sampling may be disadvantageous for certain applications.

Figure 4:
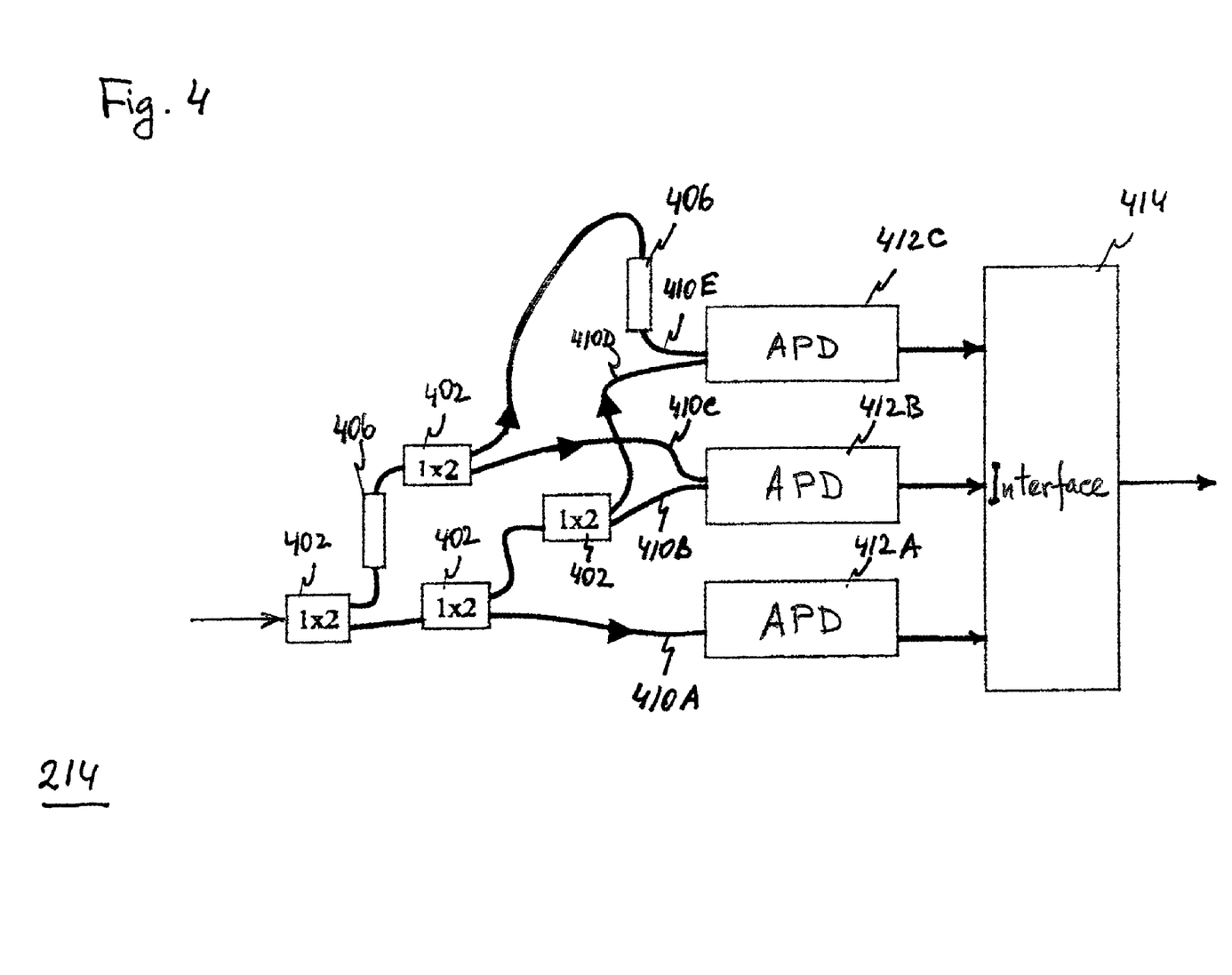
FIG. 4 shows an optical autocorrelator that may be used in the optical performance monitor of FIG. 2 according to another embodiment of the present invention.

FIG. 4 shows another possible implementation of OAC 214, which implementation does not have moving parts and is configured to generate autocorrelation points in parallel. Consequently, OPM 110 having OAC 214 of FIG. 4 generates autocorrelation points corresponding to the same data set. In the implementation of FIG. 4, OAC 214 is configured to sample three autocorrelation points. In different implementations, different numbers of autocorrelation points may be sampled using a similar principle.

OAC 214 comprises four 1×2 splitters 402, two fixed or variable fiber delays 406, three APDs 412A-C, and an interface 414. Each APD 412 may be similar to APD 312 of FIG. 3. In one embodiment, delays 406 may be, for example, ½-bit delays (e.g., 12.5 ps for 40 Gb/s). An optical signal applied to OAC 214 is split into five copies 410A-E using splitters 402. Each copy arrives at the corresponding APD 412 via a different optical path. The relative delays corresponding to the copies are as follows: (i) 0 bit for 410A, 410B, and 410D; (ii) ½ bit for 410C; and (iii) 1 bit for 410E. By processing two selected copies in an APD, a particular autocorrelation point may be sampled. For example, APD 412C processes copies 410D and 410E, therefore sampling the 1-bit delay autocorrelation point. Similarly, APD 412B processes copies 410B and 410C and APD 412A processes copy 410A with itself, therefore sampling the ½-bit and 0-bit delay autocorrelation points, respectively. The corresponding copies are preferably processed in each APD 412 in an interference fringe free configuration. Such configuration may be implemented, for example, by directing parallel fiber outputs onto a lens configured to focus the fiber outputs onto an APD face at a small angle with respect to each other. Electrical signals generated by APDs 412 are output from OAC 214 to SPM 204 via interface 414.

Additional implementations of OAC 214 may be realized using different optical platforms. For example, the implementation of FIG. 3 may be realized using free space optics instead of fibers. In addition, the implementation of FIG. 4 may be realized using planar waveguide optics.

Optical Signal Impairments

The following provides a description of representative impairments in an optical signal that may be monitored using an OPM of the present invention.

Fluctuations of the peak power of an optical signal may be monitored, e.g., using a 0-bit delay point of the autocorrelation function. The peak power typically corresponds to the top (or logical one) rail of data. Therefore, fluctuations of the peak power may introduce bit errors at the receiver. The fluctuations may arise, for example, due to multiplicative noise or amplified spontaneous emission beat noise in optical amplifiers. Since typical noise sources for the top rail are broadband, they usually manifest themselves proportionally at relatively low and high frequencies. Therefore, relatively slow monitoring of fluctuations of the 0-bit delay point, e.g., using statistical element 226 (FIG. 2), may provide a measure of the total broadband noise on the top rail of data.

A similar approach may be implemented for monitoring fluctuations for the bottom (or logical zero) rail of data using a ½-bit delay point of the autocorrelation function. Such fluctuations may similarly be measured using statistical element 226.

Average power levels at the top and bottom rails of data may be obtained from the 0-bit and ½-bit delay points, respectively, using LPF element 224 (FIG. 2). These levels may be used to measure the contrast of an optical signal, e.g., to evaluate an eye of an optical channel. Furthermore, pulse broadening may also be monitored using the 0-bit and ½-bit delay points since it has the effect of reducing the contrast of an optical signal. In addition, loss of data modulation may be detected from a ratio of the average power level at the 0-bit delay point and the square of the average optical power measured using PD 216. For example, if this ratio approaches one, then the optical signal may no longer be modulated with data. On the other hand, a relatively large value of this ratio may be indicative of a relatively wide eye of the corresponding optical channel.

Pulse-to-pulse timing jitter may be monitored using amplitude changes of the ½-bit and 1-bit delay autocorrelation points. This type of jitter has the effect of increasing the amplitude of the ½-bit delay point while simultaneously decreasing the amplitude of the 1-bit delay point.

Timing jitter on different time scales may be monitored, e.g., using autocorrelation points corresponding to multiples of 1-bit delay. For example, to evaluate timing jitter on a 1-bit delay scale (e.g., 100 ps for 10 Gb/s), the 0-bit and 1-bit delay points may be compared. Similarly, to evaluate timing jitter on an n-bit delay scale (e.g., n×100 ps for 10 Gb/s), the 0-bit and n-bit delay points may be compared. More specifically, higher jitter will result in a decreased ratio of the amplitudes corresponding to the 0-bit and n-bit delay points.

Simultaneously monitoring the 1-bit and 0-bit delay points may be used to detect signal errors associated with false logical ones and/or zeros. For example, for a pseudo-random data stream, the ratio of the amplitudes at those points is approximately 0.5. The presence of false logical ones and/or zeros may destroy the pseudo-random character of data, which will manifest itself in a corresponding deviation of the ratio from 0.5. Hence, a negative or positive deviation from 0.5 will be indicative of errors favoring logical zeros or ones, respectively.

The following description relates to dispersion monitoring using an OPM of the present invention. Before implementations of dispersion monitoring are described in detail, a brief general description of the effects of chromatic dispersion on the power spectrum of an intensity-modulated data signal is provided.

Chromatic dispersion is known to add a quadratic phase shift about the carrier frequency to the power spectrum of a propagating signal. The dispersion phase shift ($\Phi_d$) may be expressed by Equation (2) as follows:

$$\Phi_d = \pi \lambda_0^2 (f - f_0)^2 \frac{D}{c} \quad (2)$$

where $\lambda_0$ is the center wavelength; f is frequency; $f_0$ is the optical frequency corresponding to the center wavelength; D is the total accumulated dispersion (usually measured in ps/nm); and c is the speed of light. Using Equation (2), one can describe the total accumulated dispersion in terms of the phase shift appearing at frequency $f=f_0+f_c$, where $f_c$ is the clock frequency corresponding to the data modulation rate (e.g., 10 GHz for 10 Gb/s). For example, a dispersion value of 1000 ps/nm for a signal modulated at 10 Gb/s corresponds to approximately $0.8\pi$ radians phase shift at a frequency 10 GHz off the center frequency. It is known that significant pulse distortions begin to appear for phase shifts that are on the order of $\pi$ radians.

Figure 5A:
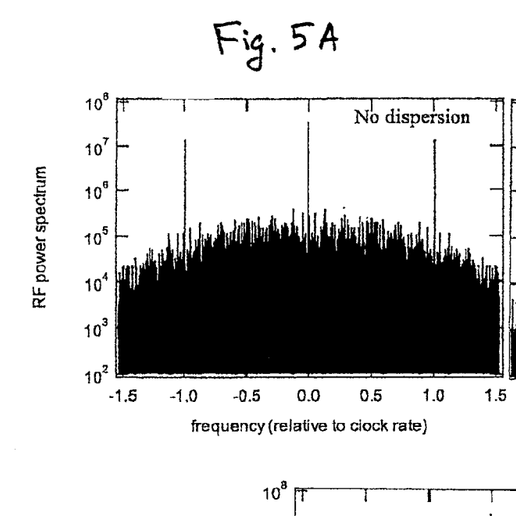
FIGS. 5A-E illustrate the effects of chromatic dispersion on the power spectrum of a pseudo-random, return-to-zero (RZ) optical data signal.
Figure 5B:
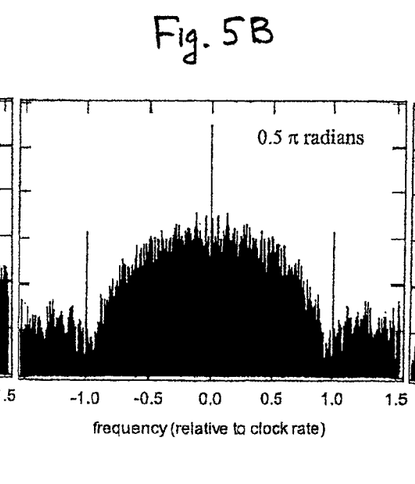
Figure 5C:
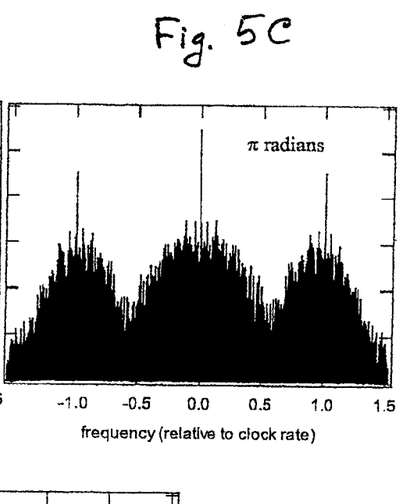
Figure 5D:
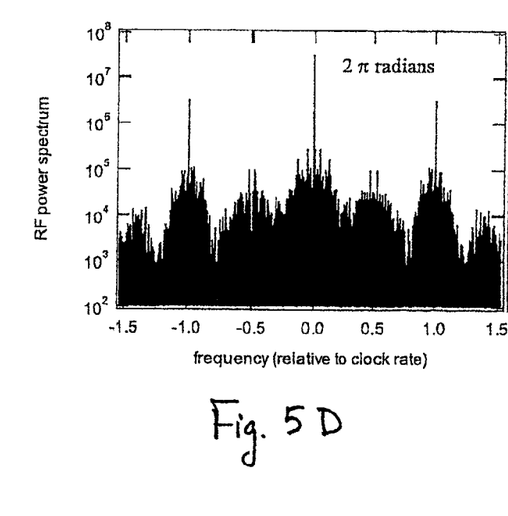
Figure 5E:
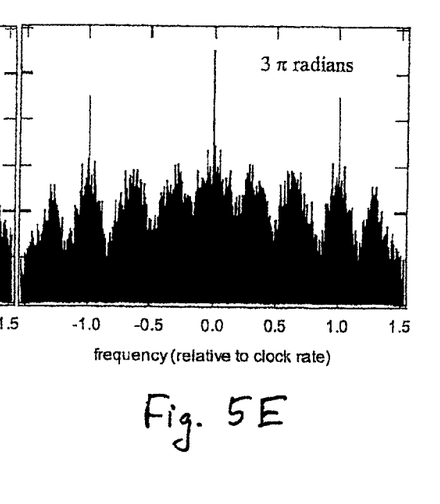

FIGS. 5A-E illustrate the effects of chromatic dispersion on the power spectrum of a pseudo-random, return-to-zero (RZ), 40% duty cycle optical data signal. FIG. 5A is a detected RF (radio-frequency) power spectrum of a representative $2^{14}$-bit data sequence in the absence of chromatic dispersion. FIGS. 5B-E show the RF power spectra of the same data sequence after it was subjected to various amounts of chromatic dispersion, more specifically, 0.5, 1.0, 2.0, and $3.0\pi$ radians, respectively. As indicated by the results of FIGS. 5A-E, one effect of chromatic dispersion is to impart a periodic series of nulls on the spectrum with the nulls propagating to lower frequencies as the dispersion is increased and the periodicity of nulls proportional to the corresponding amount of chromatic dispersion. Therefore, one can determine the amount of chromatic dispersion, e.g., by monitoring the RF power spectrum and measuring such periodicity.

It is known that a Fourier transform of the autocorrelation function of a time-dependent function corresponds to the power spectrum of that time-dependent function. Therefore, one method of determining the amount of chromatic dispersion is to (1) sample the autocorrelation function using OAC 214 (FIG. 2); (2) obtain a power spectrum using FFT element 222; and (3) determine the degree of dispersion from the modulation periodicity of the power spectrum, e.g., using processor 228. This method may be used, for example, when OAC 214 is configured to sample a relatively large number of autocorrelation points. However, if the number of sampled points is relatively low, a different method may need to be applied.

In one embodiment, OPM 110 of FIG. 2 may have an inexpensive OAC 214 configured to sample very few autocorrelation points. The following is an example of how the amount of chromatic dispersion may be monitored using OAC 214 configured to sample only three autocorrelation points corresponding to 0-, ½-, and 1-bit delays. A Fourier transform of the autocorrelation function represented by those points has three components in the frequency domain (spectral components). If T is the bit period, then the spectral components are located at frequencies corresponding to 0 (or DC), 1/T, and 1/(2T).

Figure 6:
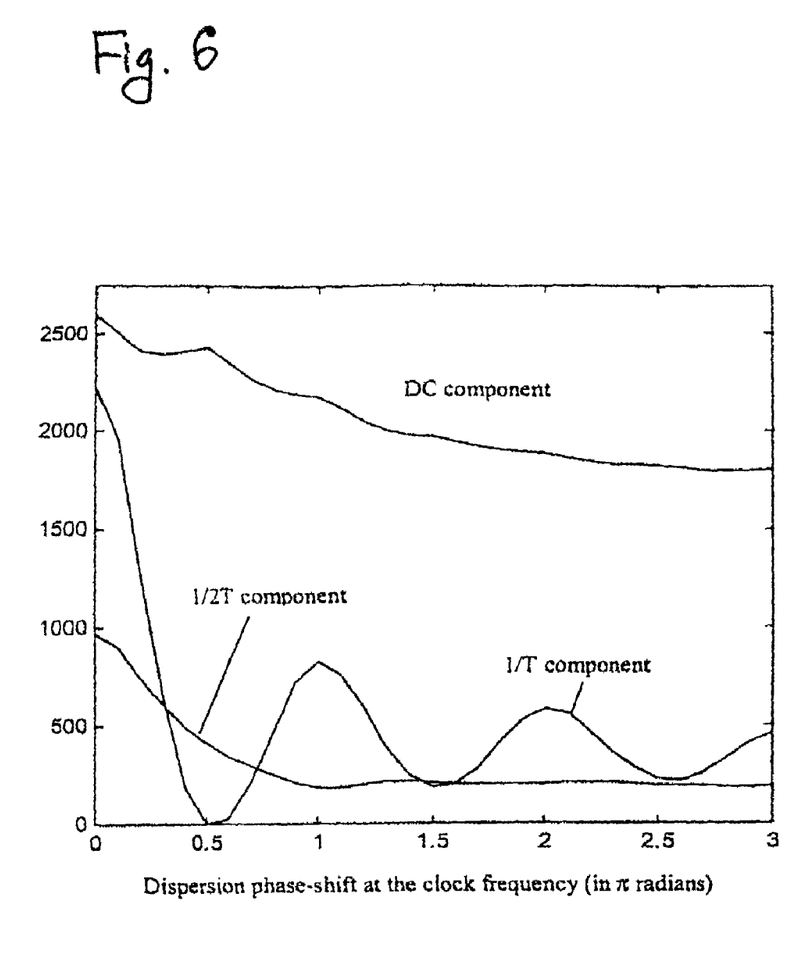
FIG. 6 illustrates the effect of chromatic dispersion on the amplitudes of three spectral components obtained based on three autocorrelation points.

FIG. 6 shows the effect of chromatic dispersion on the amplitudes of three spectral components obtained as described above and corresponding to the power spectra shown in FIGS. 5A-E. The results of FIG. 6 indicate that the 1/T component is most sensitive to chromatic dispersion changes between 0 and $0.5\pi$ radians. However, using that component beyond $0.5\pi$ radians does not provide a one-to-one correspondence between the amplitude and chromatic dispersion value, thus making the measurement ambiguous. The results of FIG. 6 further indicate that using the 1/(2T) component may extend the non-ambiguity range up to about $1.0\pi$ radians. However, this extension is achieved at the cost of lower sensitivity to chromatic dispersion changes. Depending on the requirements to the sensitivity and to the range of chromatic dispersion that needs to be monitored, either component may be used to determine the degree of chromatic dispersion.

Signal processing techniques may be applied to further extend the range of chromatic dispersion that can be monitored using three samples of the autocorrelation function. For example, a method of windowing the samples (also termed in the literature as apodization or filtering in the time domain) is well known in the art. Certain properties of a spectrum can be improved by convolving the spectrum with a more satisfactory shape than a sinc curve effectively applied to the spectrum due to the limited number of samples (truncation modulation). Because convolution in the frequency domain is equivalent to multiplication in the time domain, one method of windowing is to multiply the samples before Fourier transformation by a time-domain windowing function. One example of such windowing function may be a triangular function. Other windowing functions, e.g., exponential, may be used as well.

Figure 7:
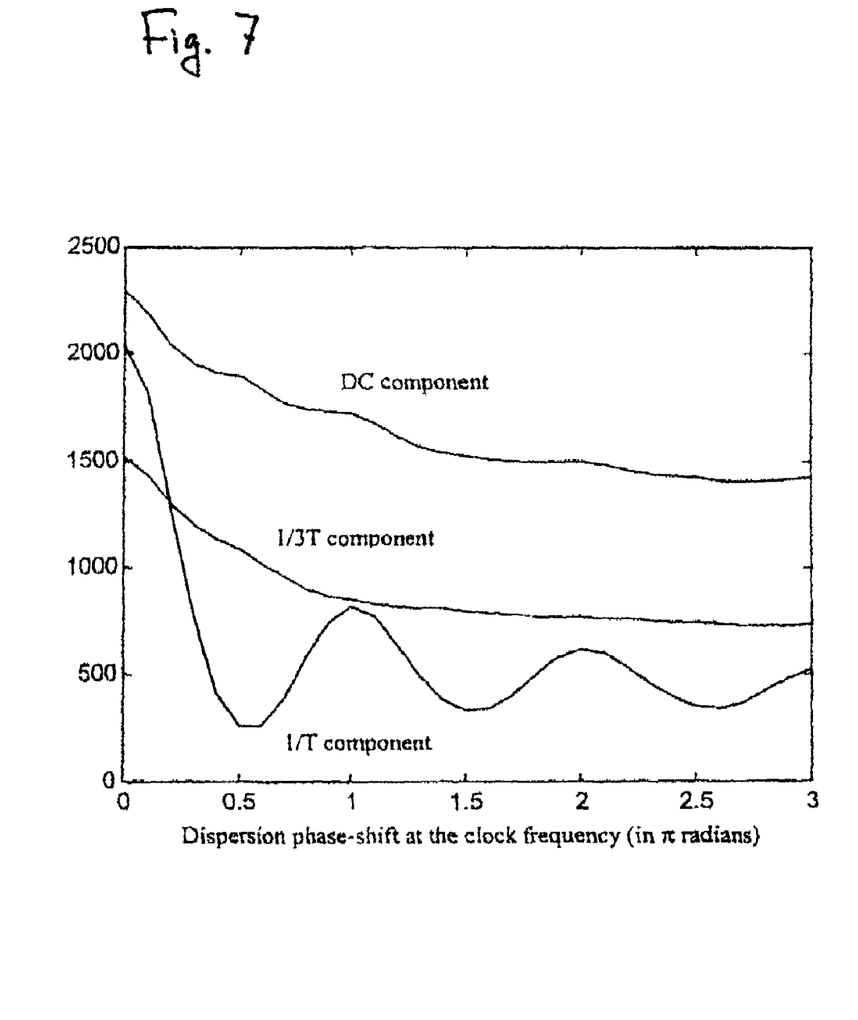
FIG. 7 illustrates the effect of chromatic dispersion on the amplitudes of three different spectral components corresponding to the three autocorrelation points used to produce the spectral components shown in FIG. 6 and obtained using zero-filling and a triangular time-domain windowing function.

FIG. 7 shows the effect of chromatic dispersion on the amplitudes of three spectral components corresponding to the power spectra shown in FIGS. 5A-E and obtained as follows. The autocorrelation function is sampled at 0-, ½-, and 1-bit delay points. An additional zero is appended (zero-filled) to the samples at ¾-bit delay. The resulting four points are multiplied (time domain filtered) by a triangular function represented by the following amplitudes corresponding to the four points in the order increasing delay: 1, ⅔, ⅓, and 0. Then, the zero-filled, time-domain-filtered autocorrelation function is subjected to Fourier transformation to produce four spectral components located at frequencies corresponding to DC, 1/(3T), 2/(3T), and 1/T. Three of these four spectral components, namely, DC, 1/(3T), and 1/T, are shown in FIG. 7.

As indicated by FIG. 7, the DC and 1/T components behave similar to the corresponding components in FIG. 6. However, the 1/(3T) component is monotonic to about $3.0\pi$ radians compared to only about $1.0\pi$ radians for the 1/(2T) component in FIG. 6. Therefore, using the 1/(3T) component, a wider range of chromatic dispersion values may be accessed.

In addition to monitoring chromatic dispersion, the spectral components illustrated in FIGS. 6 and 7 may also be used for monitoring other signal impairments. For example, misalignment between a pulse carver and data modulator at the transmitter may be monitored using the 1/(2T) component. The presence of misalignment creates a dip in the power spectrum located at a frequency corresponding to about 0.5 of the modulation clock frequency. Therefore, a decrease in the amplitude of the 1/(2T) component may be indicative of misalignment. On the other hand, a maximum amplitude of that spectral component may correspond to proper alignment. In one embodiment, a feedback signal based on the amplitude of the 1/(2T) component may be generated using processor 228 and applied, e.g., to the pulse carver to reduce misalignment.

Optical pulse broadening, e.g., due to polarization mode dispersion, may be monitored, for example, using two or more spectral components. Spectral effects of pulse broadening are similar to low-pass filtering since it reduces contributions into the power spectrum of relatively high frequencies while increasing contributions of relatively low frequencies. Therefore, one can monitor at least one relatively high-frequency spectral component and at least one relatively low-frequency spectral component to detect pulse broadening. More specifically, a simultaneous decrease of the former and increase of the latter will correspond to broader optical pulses arriving at the location of OPM.

As demonstrated in the foregoing, an OPM of the present invention is a versatile device that can be configured to monitor different types of optical signal impairments. Either time-domain autocorrelation points or the corresponding spectral components or both may be used in such monitoring. Depending on the particular implementation, the OPM may be configured to sample a different number of autocorrelation points variously delayed relative to each other. Although the OPM was described as having an FFT element, those skilled in the art will appreciate that a discrete Fourier transform (DFT) element may also be used. In addition, the OPM may be configured to sample optical signals corresponding to various wavelengths, waveforms, and/or modulation rates. Furthermore, an OPM may be adapted to work with two or more modulation rates by selecting appropriate sample points for each modulation rate. Although embodiments of the present invention have been described using avalanche photodiodes as OAC detectors, other types of detectors and/or nonlinear optical components, e.g., an SHG crystal (such as, KTP) followed by a linear photodetector, may also be used. In addition, a high-order nonlinear optical process, e.g., three-photon absorption, may be utilized to obtain the corresponding high-order signal autocorrelation, which can similarly be used for optical performance monitoring.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An apparatus for performance monitoring in a communication system, the apparatus comprising:
   (a) an optical autocorrelator (OAC) configured to receive an optical signal from the communication system and to generate one or more samples of an autocorrelation function corresponding to the optical signal; and
   (b) a signal processing module (SPM) configured to characterize an impairment in the optical signal based on the one or more samples, wherein:
      the OAC comprises:
         two or more splitters configured to direct three or more copies of the optical signal via three or more optical paths, wherein the three or more optical paths are characterized by two or more relative time delays; and
         one or more OAC detectors configured to generate electrical signals based on a superposition and mixing of signal copies, wherein the samples are based on said electrical signals;
      the SPM comprises a discrete Fourier transform (DFT) element configured to generate one or more spectral components based on the one or more samples; and
      the SPM is configured to characterize the impairment based on the one or more spectral components.

2. The invention of claim 1, wherein the SPM is further configured to generate a feedback signal for the communication system based on the impairment and the feedback signal is applied to the communication system to improve performance.

3. The invention of claim 1, wherein the DFT element is configured to (i) zero-fill the samples; (ii) generate the one or more spectral components based on the zero-filled samples; and (iii) apply a time-domain windowing function to the zero-filled samples, wherein:
   the samples comprise three autocorrelation points located at 0-, ½-, and 1-bit delays;
   the zero-filled samples comprise four autocorrelation points generated by appending a zero located at ³⁄₂-bit delay to the three autocorrelation points; and
   the time-domain windowing function is a triangular function.

4. The invention of claim 1, wherein the impairment is chromatic dispersion.

5. The invention of claim 1, wherein the one or more spectral components include a low-frequency component and a high-frequency component and the impairment is pulse broadening.

6. The invention of claim 1, wherein:
   the optical signal is based on a data signal modulated at clock frequency and generated using a data modulator and a pulse carver;
   the one or more spectral components include a component located at about one half of the clock frequency; and
   the impairment is misalignment between the data modulator and the pulse carver.

7. The invention of claim 1, wherein:
   the SPM comprises a statistical element configured to measure one or more amplitude changes corresponding to the one or more samples; and
   the SPM is configured to characterize the impairment based on the one or more amplitude changes.

8. The invention of claim 7, wherein the one or more samples include a 0-bit delay autocorrelation point and the impairment is peak power fluctuations of the optical signal.

9. The invention of claim 7, wherein the one or more samples include a ½-bit delay autocorrelation point and the impairment is power fluctuations.

10. The invention of claim 7, wherein the one or more samples include ½- and 1-bit delay autocorrelation points and the impairment is pulse-to-pulse timing jitter in the optical signal.

11. The invention of claim 7, wherein:
   the optical signal is based on a pseudo-random data signal;
   the one or more samples include 0- and 1-bit delay autocorrelation points; and
   the impairment is a deviation from the pseudo-random character.

12. The invention of claim 1, wherein:
   the SPM comprises a low pass filter (LPF) element configured to measure one or more average amplitudes corresponding to the one or more samples; and
   the SPM is configured to characterize the impairment based on the one or more average amplitudes.

13. The invention of claim 12, wherein the one or more samples include 0- and ½-bit delay autocorrelation points and the impairment is one or more of decrease of contrast, loss of data modulation, and pulse broadening.

14. The invention of claim 12, further comprising a power detector (PD) configured to measure average optical power corresponding to the optical signal and provide the average optical power measure to the SPM, wherein:
the one or more samples include a 0-bit delay autocorrelation point; and
the impairment is loss of data modulation, wherein the loss of data modulation is characterized based on a ratio of an average amplitude corresponding to the 0-bit delay autocorrelation point and the square of the average optical power.

15. The invention of claim 1, further comprising a power detector (PD) configured to measure average optical power corresponding to the optical signal and provide the average optical power measure to the SPM, wherein the SPM comprises:
a statistical element configured to measure one or more amplitude changes corresponding to the one or more samples; and
a low pass filter (LPF) element configured to measure one or more average amplitudes corresponding to the one or more samples, wherein the SPM is configured to characterize two or more impairments in the optical signal based on the one or more spectral components, amplitude changes, average amplitudes, and the optical power measure.

16. The invention of claim 15, wherein the SPM further comprises a processor configured to process the one or more spectral components, amplitude changes, average amplitudes, and the optical power measure to characterize the two or more impairments in the optical signal, wherein the processor is implemented as a look-up table.

17. The invention of claim 1, wherein a first optical path of the three or more optical paths comprises a MEMS switch coupled to a set of fixed fiber delays, wherein the MEMS switch is configured to direct a signal copy through a different fixed fiber delay to change the relative time delay corresponding to the first optical path.

18. The invention of claim 17, wherein a second optical path of the three or more optical paths comprises an adjustable fiber delay.

19. The invention of claim 1, wherein:
each of at least two OAC detectors is adapted to mix two respective relatively delayed copies of the three or more copies of the optical signal to generate a respective sample of the one or more samples; and
for each of the at least two OAC detectors, the two respective relatively delayed copies are characterized by a respective time differential between the corresponding relative delays, wherein at least two time differentials corresponding to different OAC detectors differ from one another.

20. A method for monitoring performance in a communication system, the method comprising the steps of:
(A) generating one or more samples of an optical autocorrelation function corresponding to an optical signal of the communication system; and
(B) characterizing an impairment in the optical signal based on the one or more samples, wherein said impairment comprises at least one of: (i) chromatic dispersion, (ii) misalignment between a data modulator and a pulse carver that generate the optical signal, (iii) optical pulse-to-pulse timing jitter, and (iv) deviation from a pseudo-random data character, wherein:
the step of generating comprises generating one or more spectral components based on the one or more samples; and
the step of characterizing comprises characterizing the impairment based on the one or more spectral components.

21. The invention of claim 20, further comprising the steps of:
generating a feedback signal for the communication system based on the impairment; and
applying the feedback signal to the communication system to improve performance.

22. The invention of claim 20, wherein the step of characterizing further comprises the steps of:
(i) zero-filling the samples;
(ii) generating the one or more spectral components based on the zero-filled samples; and
(iii) applying a time-domain windowing function to the zero-filled samples, wherein:
the samples comprise three autocorrelation points located at 0-, ½-, and 1-bit delays;
the zero-filled samples comprise four autocorrelation points generated by appending a zero located at 3/2-bit delay to the three autocorrelation points; and
the time-domain windowing function is a triangular function.

23. The invention of claim 20, wherein the impairment is the chromatic dispersion.

24. The invention of claim 23, wherein:
said one or more spectral components comprises an 1/T component, where T is a bit period; and
the step of characterizing comprises determining the amount of said chromatic dispersion based on intensity of said 1/T component.

25. The invention of claim 24, wherein:
said one or more spectral components further comprise at least one of ½T and ⅓T components; and
the step of characterizing comprises determining the amount of said chromatic dispersion based on intensities of at least one of said ½T and ⅓T components.

26. The invention of claim 20, wherein:
the one or more spectral components include a low-frequency component and a high-frequency component;
the impairment comprises pulse broadening; and
the step of characterizing comprises characterizing the pulse broadening based on relative intensities of said low-frequency and high-frequency components.

27. The invention of claim 20, wherein:
the optical signal is based on a data signal modulated at clock frequency and generated using the data modulator and the pulse carver;
the one or more spectral components include a component located at about one half of the clock frequency;
the impairment is the misalignment between the data modulator and the pulse carver; and
the step of characterizing comprises characterizing the amount of said misalignment based on intensity of said spectral component located at about one half of the clock frequency.

28. The invention of claim 20, wherein the step of generating comprises measuring one or more amplitude changes corresponding to the one or more samples; and the step of characterizing comprises characterizing the impairment based on the one or more amplitude changes.

29. The invention of claim 28, wherein the one or more samples include a 0-bit delay autocorrelation point and the impairment comprises peak power fluctuations of the optical signal.

30. The invention of claim 28, wherein the one or more samples include a ½-bit delay autocorrelation point and the impairment comprises power fluctuations.

31. The invention of claim 28, wherein:
the one or more samples include ½- and 1-bit delay autocorrelation points;
the impairment is the pulse-to-pulse timing jitter in the optical signal; and
the step of characterizing comprises:
measuring amplitude changes corresponding to said ½- and 1-bit delay autocorrelation points; and
characterizing said jitter based on said amplitude changes.

32. The invention of claim 28, wherein:
the optical signal is based on a pseudo-random data signal;
the one or more samples include 0- and 1-bit delay autocorrelation points;
the impairment is the deviation from the pseudo-random character; and
the step of characterizing comprises:
measuring amplitude changes corresponding to said 0- and 1-bit delay autocorrelation points; and
characterize said deviation based on said amplitude changes.

33. The invention of claim 21, wherein the step of generating comprises measuring one or more average amplitudes corresponding to the one or more samples and the step of characterizing comprises characterizing the impairment based on the one or more average amplitudes.

34. The invention of claim 33, wherein the one or more samples include 0- and ½-bit delay autocorrelation points and the impairment comprises one or more of decrease of contrast, loss of data modulation, and pulse broadening.

35. The invention of claim 33, wherein the step generating further comprises measuring average optical power corresponding to the optical signal, wherein:
the one or more samples include a 0-bit delay autocorrelation point; and
the impairment comprises loss of data modulation, wherein the step of characterizing comprises characterizing the loss of data modulation based on a ratio of an average amplitude corresponding to the 0-bit delay autocorrelation point and the square of the average optical power.

36. The invention of claim 21, wherein:
the step of generating comprises the steps of:
measuring average optical power corresponding to the optical signal;
measuring one or more amplitude changes corresponding to the one or more samples; and
measuring one or more average amplitudes corresponding to the one or more samples; and
the step of characterizing comprises characterizing two or more impairments in the optical signal based on the one or more spectral components, amplitude changes, average amplitudes, and the average optical power measure.

37. The invention of claim 36, wherein the step of characterizing further comprises processing the one or more spectral components, amplitude changes, average amplitudes, and the average optical power measure to characterize the two or more impairments in the optical signal.

38. An apparatus for performance monitoring in a communication system, the apparatus comprising:

(a) an optical autocorrelator (OAC) configured to receive an optical signal from the communication system and to generate one or more samples of an autocorrelation function corresponding to the optical signal; and
(b) a signal processing module (SPM) configured to characterize an impairment in the optical signal based on the one or more samples, wherein said impairment comprises at least one of: (i) chromatic dispersion, (ii) misalignment between a data modulator and a pulse carver that generate the optical signal, (iii) optical pulse-to-pulse timing jitter, and (iv) deviation from a pseudo-random data character;
the SPM comprises a discrete Fourier transform (DFT) element configured to generate one or more spectral components based on the one or more samples; and
the SPM is configured to characterize the impairment based on the one or more spectral components.

39. The invention of claim 38, wherein:
the impairment is the misalignment between the data modulator and the pulse carver;
the discrete Fourier transform (DFT) element is configured to generate a spectral component located at about one half of the clock frequency based on the one or more samples; and
the SPM is configured to characterize the amount of said misalignment based on intensity of said spectral component.

40. The invention of claim 38, wherein:
the impairment is the pulse-to-pulse timing jitter in the optical signal;
the one or more samples include ½- and 1-bit delay autocorrelation points;
the SPM comprises a statistical element configured to measure amplitude changes corresponding to said ½- and 1-bit delay autocorrelation points; and
the SPM is configured to characterize said jitter based on said amplitude changes.

41. The invention of claim 38, wherein:
the optical signal is based on a pseudo-random data signal, wherein the impairment is the deviation from the pseudo-random character;
the one or more samples include 0- and 1-bit delay autocorrelation points;
the SPM comprises a statistical element configured to measure amplitude changes corresponding to said 0- and 1-bit delay autocorrelation points; and
the SPM is configured to characterize said deviation based on said amplitude changes.

42. An apparatus for performance monitoring in a communication system, the apparatus comprising:
(a) an optical autocorrelator (OAC) configured to receive an optical signal from the communication system and to generate one or more samples of an autocorrelation function corresponding to the optical signal; and
(b) a signal processing module (SPM) configured to characterize an impairment in the optical signal based on the one or more samples, wherein:
the impairment is chromatic dispersion;
the SPM comprises a discrete Fourier transform (DFT) element configured to generate one or more spectral components based on the one or more samples; and
the SPM is configured to characterize the impairment based on the one or more spectral components.

43. The invention of claim 42, wherein:
said one or more spectral components comprises an 1/T component, where T is a bit period; and the SPM is adapted to determine the amount of said chromatic dispersion based on intensity of said 1/T component.

44. The invention of claim 43, wherein:
said one or more spectral components further comprise at least one of ½T and ⅓T components; and
the SPM is further adapted to determine the amount of said chromatic dispersion based on intensities of at least one of said ½T and ⅓T components.

45. An apparatus for performance monitoring in a communication system, the apparatus comprising:
(a) an optical autocorrelator (OAC) configured to receive an optical signal from the communication system and to generate one or more samples of an autocorrelation function corresponding to the optical signal; and
(b) a signal processing module (SPM) configured to characterize an impairment in the optical signal based on the one or more samples, wherein:
the impairment is pulse broadening;
the SPM comprises a discrete Fourier transform (DFT) element configured to generate a low-frequency component and a high-frequency component based on the one or more samples; and
the SPM is configured to characterize the impairment based on relative intensities of said low-frequency and high-frequency components.

46. A method for monitoring performance in a communication system, the method comprising the steps of:
(A) generating one or more samples of an optical autocorrelation function corresponding to an optical signal of the communication system; and
(B) characterizing an impairment in the optical signal based on the one or more samples, wherein:
the impairment is pulse broadening;
the step of generating comprises generating a low-frequency component and a high-frequency component based on the one or more samples; and
the step of characterizing comprises characterizing the impairment based on relative intensities of said low-frequency and high-frequency components.

47. An apparatus for performance monitoring in a communication system, the apparatus comprising:
(a) an optical autocorrelator (OAC) configured to receive an optical signal from the communication system and to generate one or more samples of an autocorrelation function corresponding to the optical signal; and
(b) a signal processing module (SPM) configured to characterize an impairment in the optical signal based on the one or more samples, wherein:
the OAC comprises:
two or more splitters configured to direct three or more copies of the optical signal via three or more optical paths, wherein the three or more optical paths are characterized by two or more relative time delays; and
one or more OAC detectors configured to generate electrical signals based on a superposition and mixing of signal copies, wherein the samples are based on said electrical signals;
the SPM comprises a low pass filter (LPF) element configured to measure one or more average amplitudes corresponding to the one or more samples; and
the SPM is configured to characterize the impairment based on the one or more average amplitudes.

48. The invention of claim 47, wherein the one or more samples include 0- and ½-bit delay autocorrelation points and the impairment is one or more of decrease of contrast, loss of data modulation, and pulse broadening.

49. The invention of claim 47, further comprising a power detector (PD) configured to measure average optical power corresponding to the optical signal and provide the average optical power measure to the SPM, wherein:
the one or more samples include a 0-bit delay autocorrelation point; and
the impairment is loss of data modulation, wherein the loss of data modulation is characterized based on a ratio of an average amplitude corresponding to the 0-bit delay autocorrelation point and the square of the average optical power.

50. A method for monitoring performance in a communication system, the method comprising the steps of:
(A) generating one or more samples of an optical autocorrelation function corresponding to an optical signal of the communication system; and
(B) characterizing an impairment in the optical signal based on the one or more samples, wherein:
said impairment comprises at least one of: (i) chromatic dispersion, (ii) misalignment between a data modulator and a pulse carver that generate the optical signal, (iii) optical pulse-to-pulse timing jitter, and (iv) deviation from a pseudo-random data character;
the step of generating comprises measuring one or more average amplitudes corresponding to the one or more samples; and
the step of characterizing comprises characterizing the impairment based on the one or more average amplitudes.

51. The invention of claim 50, wherein the one or more samples include 0- and ½-bit delay autocorrelation points and the impairment comprises one or more of decrease of contrast, loss of data modulation, and pulse broadening.

52. The invention of claim 50, wherein the step generating further comprises measuring average optical power corresponding to the optical signal, wherein:
the one or more samples include a 0-bit delay autocorrelation point; and
the impairment comprises loss of data modulation, wherein the step of characterizing comprises characterizing the loss of data modulation based on a ratio of an average amplitude corresponding to the 0-bit delay autocorrelation point and the square of the average optical power.

* * * * *